United States Patent Office 3,338,934

Patented Aug. 29, 1967

3,338,934

[(ALKOXYPHENYL SULFONYL) CYCLOPENTA-DIENYL] MANGANESE TRICARBONYLS

John Kozikowski, Walled Lake, Mich., and Michael Cais, Haifa, Israel, assignors to Ethyl Corporation, New York, N.Y., a corporation of Virginia No Drawing. Original application Aug. 12, 1960, Ser. No. 49,135. Divided and this application May 13, 1963, Ser. No. 283,136

2 Claims. (Cl. 260—429)

This application is a division of application Ser. No. 49,135, filed Aug. 12, 1960, now abandoned.

This invention relates to a variety of organometallic compounds and the processes employed in their production. More specifically, this invention relates to compounds and processes involving the use of a cyclopentadienyl sulfonyl halide manganese tricarbonyl compound.

An object of our invention is to provide new organometallic compounds and processes for their preparation. A further object is to provide cyclopentadienyl manganese tricarbonyl derivatives and processes for their preparation. Additional objects will become apparent from a reading of the specification and claims which follow.

The objects of our invention are accomplished by providing novel compounds such as [(methoxyphenylsulfonyl)cyclopentadienyl]manganese tricarbonyls, prepared by reacting a cyclopentadienyl sulfonyl halide manganese tricarbonyl compound having the formula

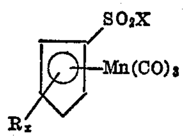

with an aromatic compound under Friedel Crafts conditions. In the above formula, X is a halogen, R is a univalent hydrocarbon group containing from one to about eight carbon atoms, and $x$ is an integer ranging from zero to three. The aromatic compound which is reacted with the sulfonyl halide reactant may be substituted provided that the substituent groups are ortho and para-directing. To further illustrate this reaction, there is presented the following example.

*Example I*

(Chlorosulfonyl - cyclopentadienyl)manganese tricarbonyl (3 g., 0.01 mole), anisole (7 g.) which also served as solvent, and aluminum chloride (3 g.) were refluxed together, with stirring, for 30 minutes. After cooling, the mixture was poured over ice and extracted with ether. The ether extract, after drying (sodium sulfate) was evaporated to dryness (water-pump vacuum and steam bath heating). The brown residue was dissolved in hot methanol (50 ml.), boiled with activated carbon (Norit-A), and the filtrate was concentrated on the steam bath until the appearance of crystals. After cooling and filtering, one gram of yellow crystalline [(o-methoxyphenylsulfonyl)cyclopentadienyl] manganese tricarbonyl was obtained, M.P. 130–152°, which after two more recrystallizations from methanol yielded 0.3 g., M.P. 186–188°.

*Analysis.*—Calcd. for $C_{15}H_{11}MnO_6S$: C, 48.1; H, 2.94; Mn, 14.7. Found: C, 48.3; H, 3.04; Mn, 14.9.

The methanol mother liquor from the original filtration was further concentrated and on cooling yielded 0.8 g. of yellow crystals, M.P. 120–132°. One recrystallization from benzene petroleum ether afforded 0.5 g. of crystalline [(p - methoxyphenylsulfonyl)cyclopentadienyl] manganese tricarbonyl of M.P. 134–136°.

*Analysis.*—Found: C, 48.1; H, 2.97; Mn, 14.8.

The infrared spectra of the two isomers were similar but not identical. The main differences occurred in the "finger print" region (above 900 cm.$^{-1}$) but some significant differences could be observed even at the lower frequencies. Both isomers exhibited the typical sulfone bands in the 1100 cm.$^{-1}$ and 1300 cm.$^{-1}$ regions.

The preparation of cyclopentadienyl sulfonyl halide manganese tricarbonyls, the starting materials in this invention, as well as the preparation of other related cyclopentadienyl manganese tricarbonyl compounds is fully described in our copending applications Ser. No. 283,139 and Ser. No. 283,140, filed May 13, 1963, now respectively U.S. Patent Nos. 3,205,245, and 3,205,246, issued Sept. 7, 1965.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of [(methylsulfonyl)cyclopentadienyl] manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:

1. [(o - Methoxy phenylsulfonyl)cyclopentadienyl] manganese tricarbonyl.

2. [(p - Methoxy phenylsulfonyl)cyclopentadienyl] manganese tricarbonyl.

References Cited

UNITED STATES PATENTS 3,028,406 4/1962 Brantley ----------- 260—429

FOREIGN PATENTS 572,013 3/1959 Canada.

OTHER REFERENCES

Cais et al.: Chemistry and Industry (Feb. 20, 1960), page 202.

Cotton et al.: Chemistry and Industry (1958), page 1368–9.

Kozikowski et al.: Jour. Am. Chem. Soc., vol. 81 (1959), page 2995–7.

Suter: The Organic Chemistry of Sulfur, John Wiley and Sons, New York, N.Y. (1944), page 673–5.

TOBIAS E. LEVOW, *Primary Examiner.*

A. P. DEMERS, *Assistant Examiner.*